(12) United States Patent
Yfantis

(10) Patent No.: US 6,633,679 B1
(45) Date of Patent: Oct. 14, 2003

(54) VISUALLY LOSSLESS STILL IMAGE COMPRESSION FOR CMYK, CMY AND POSTSCRIPT FORMATS

(75) Inventor: Evangelos A. Yfantis, Bel Air, MD (US)

(73) Assignee: Teletechnologies, Ltd., Bel Air, MD (US)

( * ) Notice: Subject to any disclaimer, the term of this patent is extended or adjusted under 35 U.S.C. 154(b) by 0 days.

(21) Appl. No.: 09/532,497

(22) Filed: Mar. 22, 2000

Related U.S. Application Data
(60) Provisional application No. 60/125,737, filed on Mar. 23, 1999.

(51) Int. Cl.[7] .................................................. G06K 9/36
(52) U.S. Cl. ........................................................ 382/240
(58) Field of Search .............................. 382/232, 236, 382/238, 240, 242, 248, 250; 358/432, 433; 348/384.1, 394.1–395.1, 400.1–404.1, 407.1–416.1, 420.1–421.1, 425.2–430.1, 431.1; 375/240.02–240.03, 240.11–240.16, 240.18–240.2, 240.22–240.25; 341/51, 63, 65, 67, 107; 364/724.011, 724.04, 724.05, 724.13, 724.14, 725.01, 725.02

(56) References Cited

U.S. PATENT DOCUMENTS

| | | |
|---|---|---|
| 5,121,216 A | 6/1992 | Chen et al. |
| 5,170,264 A | 12/1992 | Saito et al. |
| 5,253,078 A | 10/1993 | Balkanski et al. |
| 5,629,780 A | 5/1997 | Watson |
| 5,682,152 A * | 10/1997 | Wang et al. ................... 341/50 |
| 5,748,786 A | 5/1998 | Zandi et al. |
| 5,754,696 A | 5/1998 | Miyashita et al. |
| 5,786,857 A | 7/1998 | Yamaguchi |
| 6,014,468 A | 1/2000 | McCarthy et al. |
| 6,018,303 A | 1/2000 | Sadeh |
| 6,155,978 A * | 12/2000 | Cline et al. ................. 600/443 |

OTHER PUBLICATIONS

Hilton, Jawerth, Sengupta, "Compressing Still and Moving Images With Wavelets", Multimedia Systems Springer, Vertag (1994) 2:218–227.

* cited by examiner

*Primary Examiner*—Jose L. Couso
(74) *Attorney, Agent, or Firm*—John F. Salazar; Middleton Reutlinger

(57) ABSTRACT

A method and apparatus for visually lossless compression encoding and decoding is described. The present invention includes a method for compression of color image data directly from the CMYK color space into the compressed data matrix without the necessity of transforming the data into standard three matrix representation of the color data, typically RGB. The method also utilizes newly described stochastic wavelet transformations which transform the data in the horizontal and vertical direction prior to quantization of the coefficients. A encoding step then ensues to further compress the data of the color image. Decompression may be accomplished such that a high compression ratio is achieve without visual loss of any color data of the image.

5 Claims, 4 Drawing Sheets

VISUALLY LOSSLESS STILL IMAGE COMPRESSION FOR CMYK, CMY AND POSTSCRIPT FORMATS

This application claims priority to provisional application Ser. No. 60/125,737 filed Mar. 23, 1999.

BACKGROUND OF THE INVENTION

1. Field of the Invention

This invention relates to image compression methodologies and more particularly, to an apparatus and method for compression of still images

2. Prior Art

Still image compression techniques have been improvised and improved significantly over the past ten years to envelop highly specialized algorithms and mathematical techniques in order to increase the compression ratio of the image. This has been especially the case in recent years as transmission of digital images, particularly color images, over computer networks or telephone lines is highly demanded by consumers. Particularly, transmission of these color images at high speed is desired. In order to increase the speed of transmission for the digitized color image, compression of the image is required. There has been traditionally a trade off between compression and quality however, requiring that the developer of compression techniques and apparatus choose between high compression ratios and therefor increased transmission speeds against the quality of the image once it is decompressed to its initial, or quasi-initial appearance. Inherent in most compression techniques are tradeoffs wherein, particular aspects of the image are sacrificed in order to compress the image to a satisfactory size. These losses of data can include loss of color definition, sharpness of edge lines, or other aspects of image quality. This sacrifice of image quality, particularly for color images, comes at high costs, particularly when the typical compression ratio achieved is less than 20 to 1.

Standard image compression techniques include the following methodology:

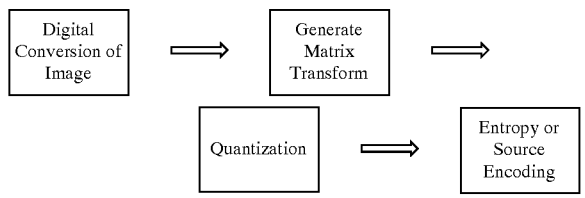

In the Digital Conversion of Image step, a CMYK, CMY or Postscript image is scanned and prepared in digital format which most likely includes representing the image in RGB or YUV components. RGB and YUV formatting allows the color image to be broken down into distinct color spectrums or luminance and then compressed based upon those spectrums. After reducing the image to particular color or luminance components, the components may be broken down into blocks of pixels for easy manipulation and analysis.

The next typical step involves generating the matrix transform wherein the image, in its component form, is transformed form one domain to another. This allows the image to be removed from the standard two dimensional image space to the frequency domain thereby causing the coefficients created to be the target of the compression routines and not the color component values themselves. The Discrete Cosine Transform or Fourier Transforms (transforms based upon a linear combinatory of sine and cosine waves with different coefficients) are used to convert the image data to the frequency domain and create the coefficient matrix. These transforms indicate the behavior in the frequency domain of the image as such, they are typically well for homogeneous image areas. The resulting transform coefficients are then compressed by possibly thresholding and also through quantization routines. Quantization may reduce the precision of the coefficients generated in the transform step but allows the actual values to be compressed. This quantization step scales the coefficients by a step size and then rounds off the value to the next integer. Finally, entropy or source encoding is utilized to further compress the quantized data. This encoding step may include run length encoding, Lempel-Ziv-Welch, Huffman, DCPM (differential pulse code modulation) or other well known coding techniques.

More recently, Fourier or DCT transformation matrices have been replaced with more complicated Wavelet transforms. As two types of compression models, lossy coding and lossless coding, have become standard, Wavelet transforms have provided a means to significantly increase compression ratios for the lossless type of compression model. In a lossless type of compression model, the input data, typically intensity data, is converted to codewords which have fewer storage requirements than the data that is coded. In the lossy model, intensity data may be quantized prior to utilization of codewords or transformation. Quantization eliminates those data elements which are not considered relevant to the characteristics of the image. Prior to the quantization step in lossy compression models, transforms are typically utilized to compress the data prior to action upon it by quantization routines.

Wavelet transforms are based on a linear combination of waveforms that are not periodic but display a strong locality, i.e. the local specifics of the image. In wavelet transformations, unlike in a DCT transformation matrix, the image is transformed as a whole, not in modularized pixel blocks. A set of dependent functions are derived from a prototype function each of which have fundamental characteristics for transformation of the data (i.e. scale and transform) such that tradeoffs may be made based upon application specific requirements. These tradeoffs flow from resolution in the time and frequency domain. The dependent functions may be scaled and transformed to meet the requirements of a particular application. Scaling and transformation coefficients are similar to the DCT coefficients. The varying dependent functions allow tradeoffs between the frequency and time resolution. As a result of these wavelet transforms, the high and low frequency portions of the image will be processed independently thus allowing the wavelet functions to act as band pass filters. Each of these filtered signals may then be further separated into various average signals and horizontal, vertical and diagonal features.

Filtering of the image in the horizontal, vertical and diagonal direction may be accomplished to produce separate images through use of high and low filter pass techniques along with an average image signal. Iterative passes may be made to further compress the image thereby producing coefficients for each image which may then be compressed further through encoding or other methods mentioned above. All of these techniques utilize data transform methodology function.

Representation of data using a set of basis functions is well known, with Fourier techniques being perhaps the most familiar. Other transform methods include the fast Fourier transform (FFT), the discrete cosine transform (DCT), and a variety of wavelet transforms. The rationalization for such transform methods is that the basis functions can be encoded by coefficient values and that certain coefficients may be treated as more significant than others based on the information content of the original source data. In doing so, they effectively regard certain coefficient values and correlations of the sort mimicked by the basis functions as more important than any other values or correlations. In essence, transform methods are a means of categorizing the correlations in an image. The limitations of such methods are a result of the unpredictability of the correlations. The variations in luminance and color that characterize an image are often localized and change across the face of the image. As a result, FFT and DCT based methods, such as JPEG, often first segment an image into a number of blocks so that the analysis of correlations can be restricted to a small area of the image. A consequence of this approach is that bothersome discontinuities can occur at the edges of the blocks.

Historical wavelet-based methods avoid this "blocking effect" somewhat by using basis functions that are more localized than sine and cosine functions. However, a problem with these historical wavelet-based methods is that they assume that a particular function is appropriate for an image and that the entire image may be described by the superposition of scaled versions of that function centered at different places within the image. Given the complexity of image data, such a presumption is often unjustified. Consequently, historical wavelet based methods tend to produce textural blurring and noticeable changes in processing and coding quality within and between images These standard compression techniques may cause significant degradation in the uncompressed image due to the varying manipulations to color, luminance and loss of data during the compression routine. Thus, it is standard to see visually optimized transformation matrices or quantization steps which attempt to reduce the amount of data loss during the compression transformation. These errors may be further enhanced by the initial transformation of the color image from standard color high definition matrix to an RGB or YUV matrix. All of these data manipulations reduce the quality of the decompressed image while achieving relatively low compression ratios.

SUMMARY OF THE INVENTION

One object of the present invention is to devise a compression algorithm for color images which achieves large compression ratios and wherein the detection of errors from the compression and decompression step is negligible. Another object of the present invention is to provide a color image compression routine which works on the standard CMYK color space and does not require conversion of the color data form standard color to RGB color representation. A third object of the present invention is to provide transformation algorithms which will not overburden a hardware system designed to compress and decompress the images thereby allowing high compression and decompression speeds through the use of efficient compression methodologies and standard electronics.

Image compression algorithms created so far for CMYK, CMY and PostScript still image convert the data to RGB then compress the RGB image data and subsequently convert back to CMYK, or CMY, or PostScript. Furthermore, the prior art typically uses the same transformation for the horizontal and vertical directions.

The image compression system of the present invention includes several novel features; First, the system of the present invention does not transfer to the RGB color space for compression but operates directly on the CMYK color space or PostScript space. The second feature is that the size of the filter transformation depends on the zone of influence of the autocorrelation function.

The third novel feature of the present invention is that the present technique treats the horizontal and vertical directions differently depending on the aspect ratio and the anisotropic behavior of the autocorrelation function in the vertical and horizontal directions. Due to the fact that the aspect ratio of the horizontal and vertical pixels is usually not equal to one, and also due to the fact that the zone of influence of the autocorrelation function in the horizontal direction is not equal to the zone of influence of the autocorrelation function in the vertical direction, it is more efficient to use a different filter size in the horizontal direction than in the vertical direction.

The optimal filter size is computed mathematically so that conversion of the floating point data obtained by the transformation from the space domain to the frequency domain from floating points to integer numbers produces relatively small error. This error is bounded by a predefined value which represents the worse case analysis error and therefore produces pixels that are either identical to the corresponding pixels of the original image or they are very close to the pixels of the original image. The difference of the corresponding pixels of the original image and the restored image are bounded by the desired error boundary chosen so that the quality of the restored image is very high and therefore no visible differences exist between the original image and the restored image. The transformations are designed to divide the image signal into disjoint frequency bands. Each band has different amount of energy. The sum of a small number of bands carries over 99% of the energy of the image signal.

The fourth innovation of the present invention is that the quantization step is directional and band dependent. The quantizer is designed so that it will not quantize the frequency bands where the energy of the system is relatively high. Alternatively, the frequency bands with relatively low energy are quantized inversely proportional to their variance. The error produced from this quantization as well as the error produced by the rounding off of the frequency domain is designed to produce a decompressed image with pixels having maximum distance from the corresponding pixels of the original image which is less than a desired error boundary. Therefor when the image is compressed and subsequently decompressed, the error produced is too small for the eye to detect. Thus, a printout of the original image and the restored image looks identical to the eye.

BRIEF DESCRIPTION OF THE DRAWINGS

A better understanding of the invention will be had upon reference to the following description in conjunction with the accompanying drawings in which like numerals refer to like parts and wherein.

DETAILED DESCRIPTION OF THE PREFERRED EMBODIMENT

Figure 1:
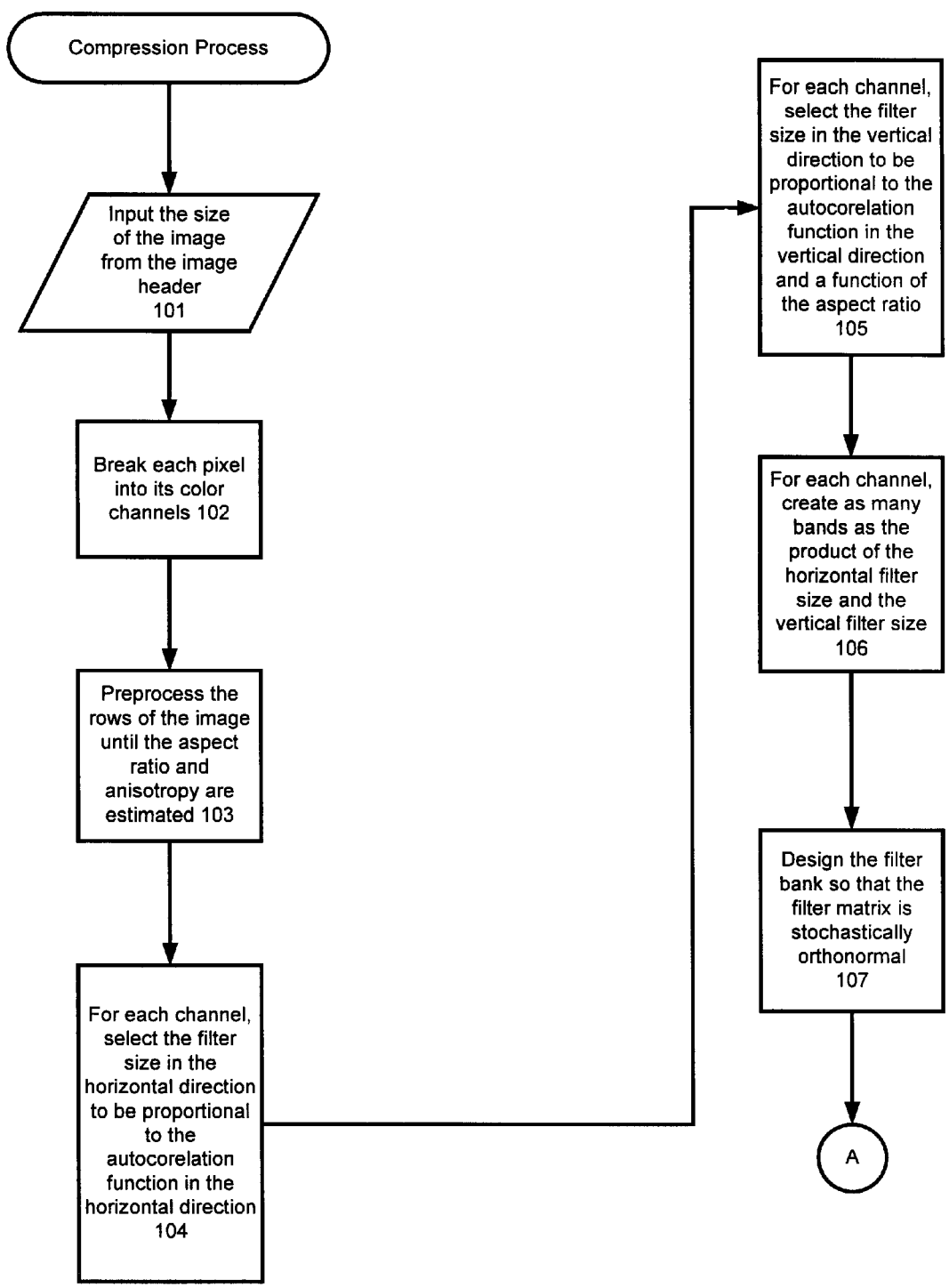
FIG. 1 is a flow chart for the compression and decompression process of the present invention.
Figure 2:
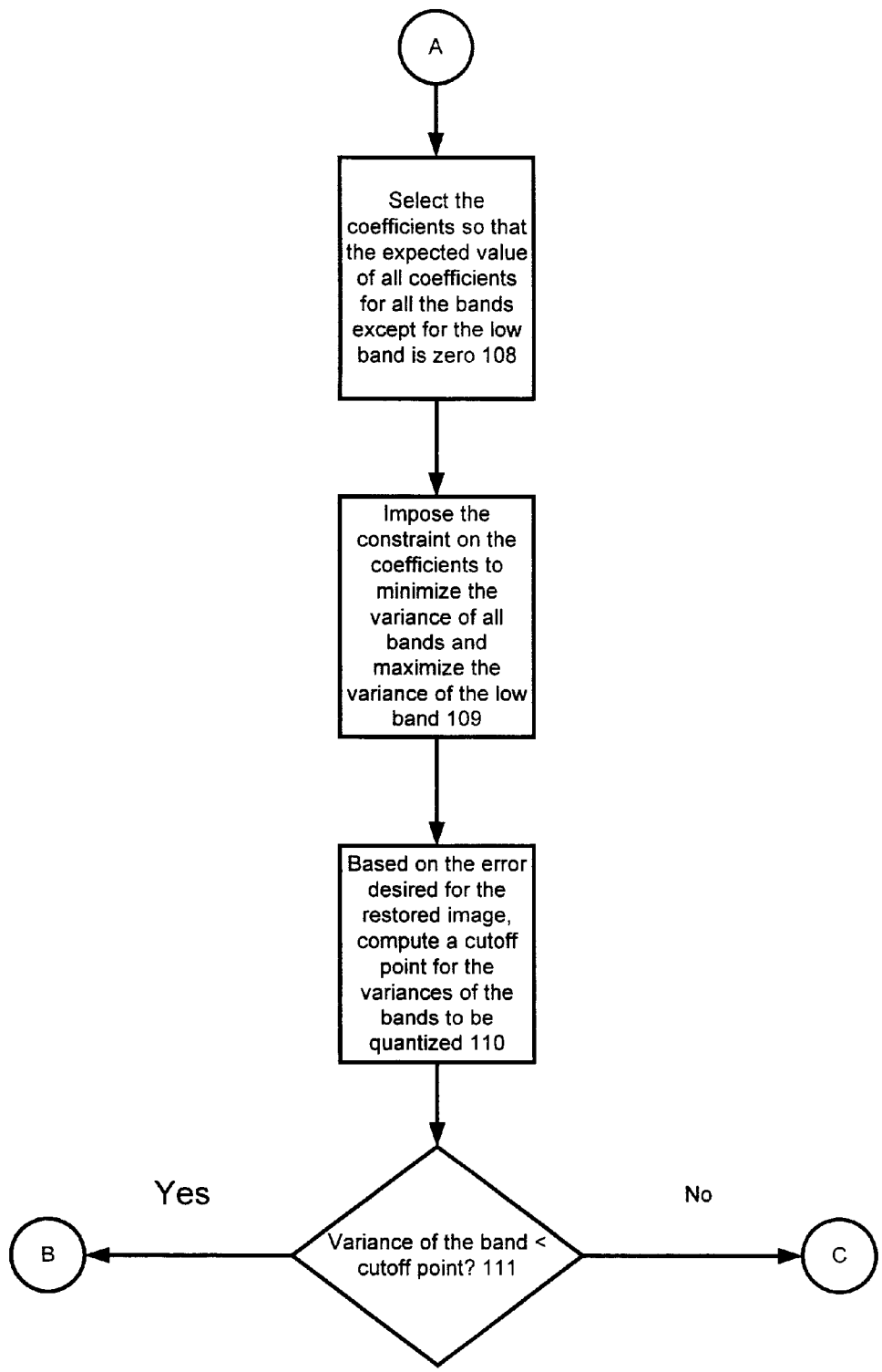
FIG. 2 is a continuation of the flow chart of FIG. 1.
Figure 3:
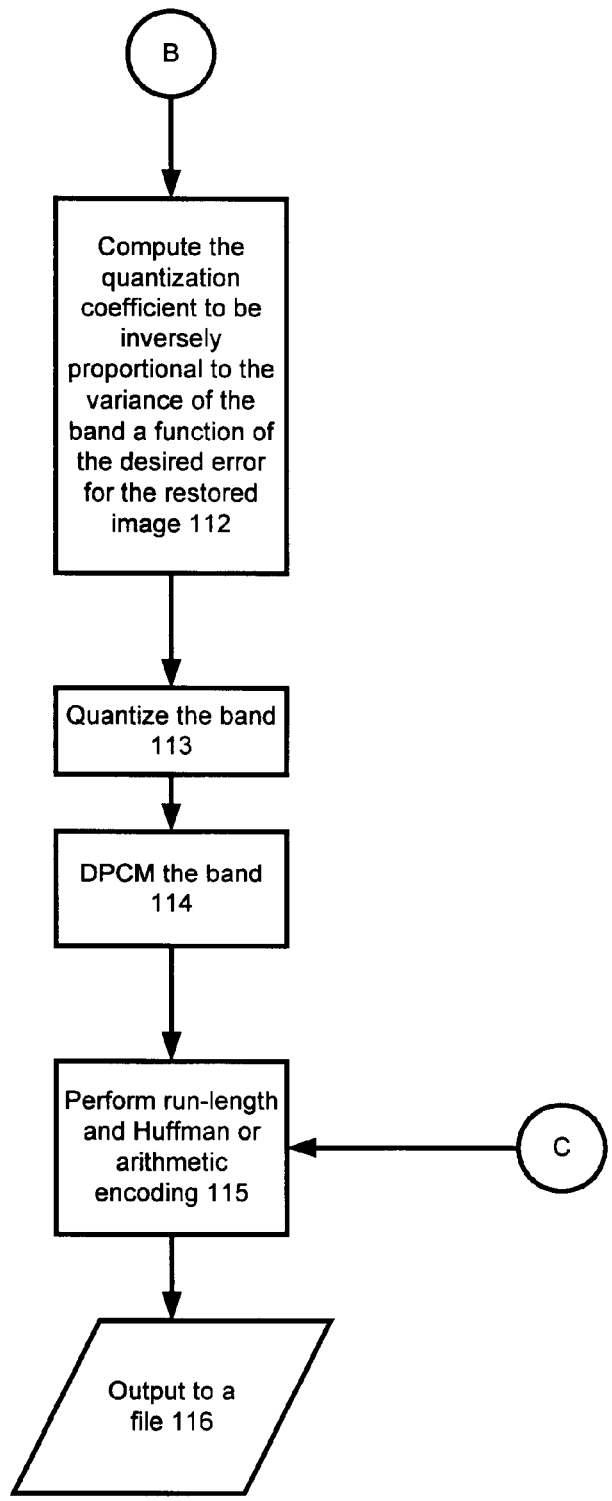
FIG. 3 is a continuation of the flow chart of FIG. 1.

The compression system of the present invention utilizes variations of known techniques as well as new features not previously utilized in color image compression. The compression of the color image begins with separating the color image into the CMYK color channels for compression. Of particular import is the transformation matrix utilized in the conversion step from the space domain to the frequency domain. The filters utilized in the transformation step are dynamically altered to maximize efficiency based upon the actual data read. Further, the filters inspect both the horizontal and vertical directional channels differently dependent upon the particular behavior of that channel. The quantization step is directional and band dependent so as to additionally increase the efficiency of the compression step based upon the data in the matrix. A brief outline of the compression steps is outlined below:

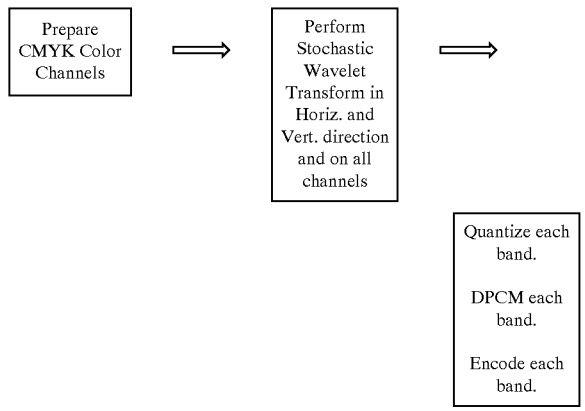

Design of the Transformation Matrix

The size of the transformation matrix is dynamic and depends on the zone of influence of the autocorrelation function. Of particular import is the ability to utilize the compression system in both the forward and backward direction. In other words, how much clarity or data of the image is lost in the transform of the data into compressed form. As indicated, transformation of data can be defined as either lossy or lossless depending on data loss. If the conversion into compressed form and decompression contributes to some amount of data loss or image degradation, the compression is considered lossy. However, if the amount of loss is negligible or non-existent, a lossless compression has taken place. Typically, trade-offs between compression ratios and either lossy or lossless compression must be considered. However, with the system of the present invention, exceptionally high compression ratios may be achieved with essentially no data loss. The compression ratios that the present invention achieves ranges between 31 to 1 to 57 to 1 or higher without noticeable change in image quality. As is known in the art, wavelet transformation degrades nicely, as opposed to Discrete Cosine Transform.

As will be further described herein, the wavelet transformation step utilized by the present invention is a stochastic wavelet transform matrix which dynamically changes in size depending on the data being compressed. Further, the stochastic wavelet transform is reversible and works directly on the four color subtractive color space.

The transformation matrix used in the horizontal direction is not necessarily the same as the one used in the vertical direction. The two matrices could be different due to the presence of anisotrophy in the image and the fact that the aspect ratio is not 1:1. The zone of influence of a pixel is defined as the minimum distance needed so that pixels with distance greater to this minimum distance are not correlated with the pixel. The dimension of the transformation matrix is selected to be such that the autocorrelation function between two pixels with distance equal to the dimension is greater than or equal to 0.5. If N is the dimension of the horizontal transformation matrix H and $$H = \begin{bmatrix} a_{11} a_{12} \ldots a_{1N} \\ a_{21} a_{22} \ldots a_{2N} \\ \ldots \\ a_{N1} a_{N2} \ldots a_{NN} \end{bmatrix} \quad (1)$$

then coefficients of the matrix H are computed so that the matrix is orthonormal.

Thus:

$$\sum_{j=1}^{N} a_{ij}^2 = 1 \quad (2)$$

$$i = 1, \ldots, N$$

$$\sum_{j=1}^{N} a_{ij} a_{kj} = 0 \quad (3)$$

$$i \neq k = 1, \ldots, N$$

Under this assumption of wide sense stationarity the expected value of all bands except for the low band is equal to zero thus:

$$\sum_{j=1}^{N} a_{ij} = 0 \quad (4)$$

$$i = 2, \ldots, N$$

The object here is to find the parameters $a_{ij}$=1, 2, 3 , ... N; j=1, 2, 3 ... N, which maximizes the variance of the low band, minimize the variance of all other bands, and satisfies the above constraints. A similar approach is used for the vertical transformation. This approach is used for each one of the color channels.

In conjunction with the outline disclosed above and with FIG. 1, the still image compression system of the present invention begins with the entry of the image size at step 101. The image is then analyzed by the system of the present invention such that each image pixel is broken into each color channel for review transformation at step 102. Preliminarily, at step 103, preprocessing of the image occurs such that each row is reviewed to determine aspect ratio and the anisotropy are estimated.

Once the image is divided among proper channels, each channel is reviewed at step 104 in order to select the appropriate filter to be utilized for the horizontal direction so that it is proportional to the autocorrelation function in the horizontal directional. Next, at step 105, a new filter is determined for each channel such that the size of the filter in the vertical direction is proportional to the autocorrelation function in the vertical direction and a function of the aspect ratio. The two filters utilized herein are therefore dynamically changed in size depending specifically upon correlation between two pixels as depicted in the above matrix in equation (1).

Next, at step 106 of the flow chart depicted in FIG. 1, for each channel, the system of the present invention creates as many bands as the product of the horizontal filter size and the vertical filter size determined above. Thus the data transformation separates the data into frequency bands dependent upon the stochastic wavelets determined by the above constraints. The filter bank is comprised of a filter matrix that is stochastically orthonormal.

Based upon the equations noted above, at step 108, the coefficients are selected such that the expected values of all coefficients in the matrices for all bands created except for the low band is zero. A constraint is placed thereafter at step 109 on the coefficient matrix in order to minimize the variance of all bands and maximize the variance of the low band. Thus, the data represented by the coefficient matrix has been prepared for proper quantization by limiting the variance between coefficient values. Based on the error desired for the restored image, at step 110, a cutoff point is computed for the variances of the bands to be quantized. If the variance of the band is above the cutoff point, quantization of the coefficient matrix occurs such that the quantization coefficient is inversely proportional to the variance at step 112. This variance is thus a function of the desired error for the restored image. The band is then quantized at step 113 and subsequently DPCM is conducted to further compress the data at step 114. Run length encoding and Huffman or arithmetic may then operate on the data at step 115.

If the constraint mentioned at step 110 is not met, the quantization does not occur on the band and the system of the present invention directly performs the actions at step 115 to perform minimal compression. Finally, at step 116, the compressed data is output to a compressed data file representative of the image data.

Figure 4:
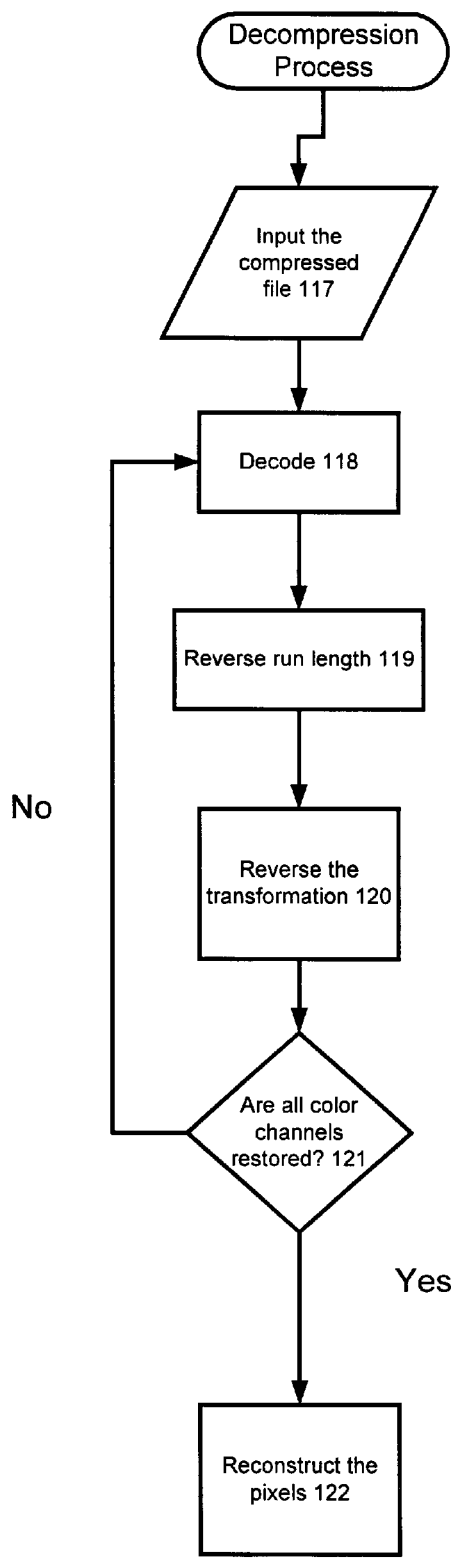
FIG. 4 is a continuation of the flow chart of FIG. 1.

For decompression of the compressed data file created as indicated above and as detailed in FIG. 4, the decompressed file is first decoded at step 118. A reverse run length expansion occurs at step 119 to prepare the matrices for reverse transformation of the stochastic wavelet. Thus, each color channel is restored iteratively and the reverse transform and other defined reverse compression steps are conducted until all color channels are restored. Each pixel is then reconstructed at step 122 for utilization of the image.

Quantization

The quantization matrix is designed to give one of two options. The first option is that the mean square error between the original and the restored image which was quantized during the compression is less than an upper value.

The second option is that the maximum error between the corresponding pixels of the restored and the original image is less than an upper value.

In either case bands with variance larger than a function of the cutoff point are not subject to quantization, while the quantization of the bands with low energy is a function of the cutoff point and is inversely proportional to the variance of the band. Bands which are not quantized are subject to estimation using DPCM (differential pulse code modulation) with parameters proportional to their autocorrelation function.

Encoding

The run-length used in the system of the present invention is another novel feature. The current process divides each band into squares of variable length. In every square the strength of numbers is reduced by subtracting the minimum from all the numbers in the square. Thus several numbers are zero and the ones that are not zero are relatively small. In each square there is used a run length that records the run-length of zero's one's and two's, using rows, columns, zigzag, or cross designs. Squares which are all zeros are signified with a special symbol. Finally, Huffman coding or arithmetic coding is used to encode the data.

Decompression

The process of decompression is a reverse process, whereby the system decodes the image data, uses the inverse run-length process, uses the reverse DPCM estimation method for the bands that DPCM was applied, unquantizes the bands that were quantized and uses all the bands to restore the channel data for each channel using inverse matrix transformations. Finally, the channels are reorganized so that the pixels of the original image are restored.

Hardware

A computer board, consisting of the electronic connections (router), a Digital Signal Processing (DSP) chip with several adders and multipliers in the chip for a parallel processing of the image, with a super-pipeline is part of the hardware software solution of the present invention. On the board there are several megabytes of fast access memory holding the image while it is being processed. A special PLD chip facilitates the communication of the board with the rest of the computer and its peripherals. The purpose of the board is to provide real time compression and or decompression of relatively large images. All the compression and decompression software resides in the DSP. Furthermore, the DSP is designed so that it will run the software in a desired speed and time frame. The design of the DSP therefore is optimal only for the compression and decompression of the present methods.

EXAMPLE 1

A TIFF image comprising a CMYK composition was compressed using the system of the present invention. A before and after review of the images comparing the details prior to compression and after reconstruction from the compressed file was conducted. The original TIFF image had a size of 27,985 KB. Once compressed by the system of the present invention, a compression ratio was achieved of 44:1 wherein the compressed output file was only 635 KB. Decompression of the compressed file restored the image to 27,885 KB. The resulting converting image was printed and compared with the original achieving visually no data loss.

EXAMPLE 2

A color image stored in EPS format was used for compression and decompression particularly to test edge detection capabilities. Clarity of a variety of different size fonts down to the very small were tested. The original color image consisted of a 10,645 KB file. The compression system of the present invention achieved a compression ratio of 32:1 producing a compressed data image of 337 KB. Restoring the image through decompression created a file of 10,645 KB. The quality of the original image included particular blemishes and line streaks. The compression system of the present invention in all cases faithfully reproduced the anomalies without exaggerating them.

In all tested cases, the compression ratios produced a decompressed product which was visually lossless. The system approaches close to zero data loss of less than 0.2%. Upon review of the examples under reflective light there was no indication of tiling anywhere in the restored image. No artifacts were observed or light or dark spots under normal magnification. In the EPS image, the entire graphic object containing both clear text and overprinted areas appeared with sharp edges and no bleeding.

What I claim is:

1. A method for processing and compressing image data, comprising:

separating a color image into individual rows of color channels for each pixel;

preprocessing said color channels rows to determine the aspect ratio and anisotropy; filtering said channels using a wavelet transform based upon said aspect ratio and anisotropy to divide the image into a plurality of disjoint frequency bands; applying a quantization routine to each of said plurality of bands; and encoding each of said plurality of bands.

2. The method of claim 1 further comprising performing differential pulse code modulation on each of said disjoint frequency bands after said quantization routine.

3. The method of claim 2 wherein said filtering of said channels occurs in the horizontal, vertical and diagonal direction of said plurality of channels.

4. The method of claim 1 wherein said color channels are directly representative of the CMYK color space.

5. The method of claim 4 wherein said filtering step is further comprised of:

generating a transformation matrix for the horizontal direction and a transformation matrix for the vertical direction; wherein the dimension of each of said transformation matrix is selected to be such that the autocorrelation function between two pixels with a distance equal to the dimension is greater than or equal to 0.5.

* * * * *